J. C. CARPENTER.
Plow.

No. 201,387.     Patented March 19, 1878.

WITNESSES:
Henry N. Miller
C. Sedgwick

INVENTOR:
J. C. Carpenter
BY
ATTORNEYS.

UNITED STATES PATENT OFFICE.

JAMES C. CARPENTER, OF COUNCIL GROVE, KANSAS.

IMPROVEMENT IN PLOWS.

Specification forming part of Letters Patent No. 201,387, dated March 19, 1878; application filed December 24, 1877.

*To all whom it may concern:*

Figure 1:
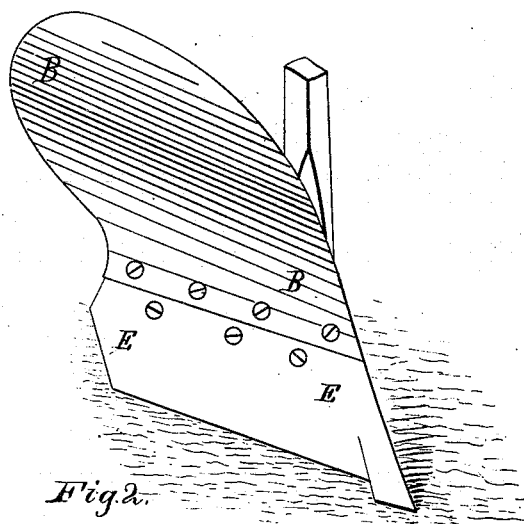
Figure 2:
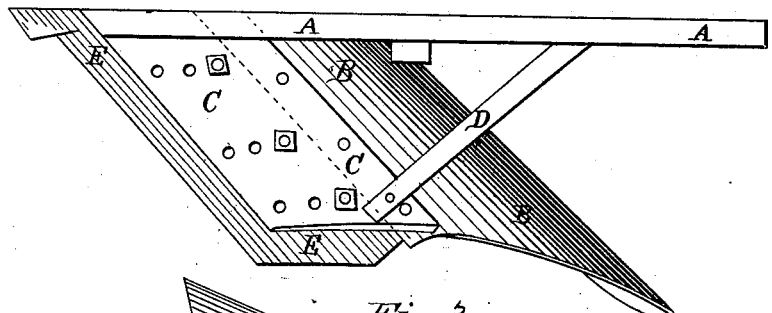
Figure 3:
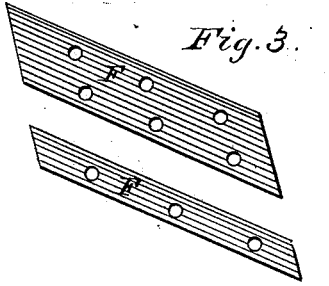

Be it known that I, JAMES C. CARPENTER, of Council Grove, in the county of Morris and State of Kansas, have invented a new and useful Improvement in Extension-Share Plows, of which the following is a specification:

Figure 1 is a front view of my improved plow, the stock being removed. Fig. 2 is a bottom view of the same. Fig. 3 is a detail view of the extension-strips.

Similar letters of reference indicate corresponding parts.

The object of this invention is to furnish an improved plow which shall be so constructed that the share, when worn, may be slipped forward one or more times, so as to enable the share to be used much longer than is possible when the plows are made in the usual way.

The invention will first be described in connection with the drawing, and then pointed out in the claim.

A represents the land-side, with which the mold-board B is connected in the usual way. The forward edge of the mold-board B rests upon, and is bolted or riveted to, the upper part of the plate C, the inner end of which is welded to the land-side A.

The outer end of the plate C is held in place, and is strengthened against the draft-strain by the brace D, the forward end of which is bolted or riveted to the said outer end of the plate C, and its rear end is secured to the rear part of the land-side A.

E is the share, which, when new, is bolted to the plate C, with its rear edge resting against the forward edge of the mold-board B.

Several sets of holes are formed in the plate C, to receive the bolts that secure the share E to the said plate C, so that as the said share wears it can be moved forward to the second set of holes, and a narrow strip, F, of steel inserted in the space between the forward edge of the mold-board B and the rear edge of the share E, and secured to the plate C with bolts. As the share E wears still farther, it is again moved forward, and the strip F, of steel, is replaced by a wider strip.

By this construction the share E can be used until completely worn out, and will last more than twice as long as the shares upon ordinary plows, and at the same time the cost of manufacture will not be materially increased.

Having thus described my invention, I claim as new and desire to secure by Letters Patent—

The combination of the strip F, of steel, with the land-side A, the mold-board B, the plate C, and the share E, whereby the space between the mold-board B and the share E is filled when the said share is moved forward, substantially as herein shown and described.

JAMES CAGWIN CARPENTER.

Witnesses:
 E. R. VANDEGRIFT,
 JOHN MALOY.